(12) United States Patent
Meyer et al.

(10) Patent No.: US 11,444,506 B2
(45) Date of Patent: Sep. 13, 2022

(54) LINE BUSHING AND TERMINAL STUDS WITH INCREASED IGNITION GAPS

(71) Applicant: Siemens Aktiengesellschaft, Munich (DE)

(72) Inventors: Johannes Meyer, Bad Birnbach (DE); Thomas Mutzl, Tettenweis (DE); Josef Sebastian Schneider, Hofkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 351 days.

(21) Appl. No.: 16/618,284

(22) PCT Filed: Jun. 1, 2018

(86) PCT No.: PCT/EP2018/064420
§ 371 (c)(1),
(2) Date: Nov. 29, 2019

(87) PCT Pub. No.: WO2018/220156
PCT Pub. Date: Dec. 6, 2018

(65) Prior Publication Data
US 2021/0159754 A1   May 27, 2021

(30) Foreign Application Priority Data
Jun. 2, 2017  (EP) .................... 17174312

(51) Int. Cl.
*H02K 5/00* (2006.01)
*H02K 5/136* (2006.01)
(Continued)

(52) U.S. Cl.
CPC .......... *H02K 5/136* (2013.01); *H01R 13/533* (2013.01); *H02G 3/22* (2013.01); *H02K 5/225* (2013.01)

(58) Field of Classification Search
CPC ...... H02K 5/136; H02K 5/225; H01R 13/533; H02G 3/22
(Continued)

(56) References Cited

U.S. PATENT DOCUMENTS 1,618,877 A * 2/1927 Henry ................... G10K 9/10
310/90
2,080,678 A * 5/1937 Van Horn .............. H02K 5/132
310/410

(Continued)

FOREIGN PATENT DOCUMENTS

EP     0087960 B1 *  6/1988  ............. H02K 5/136
EP     2409385 B1     3/2016
(Continued)

OTHER PUBLICATIONS

DIN EN 60079-0 (VDE 0170-1); Explosionsgefährdete Bereiche—Tell 0: Betriebsmittel—Allg. Anforderungen (IEC 60079-0:2017; Deutsche Fassung EN IEC 60079-0:2018; Gesamtumfang 158 Seiten.
(Continued)

*Primary Examiner* — Maged M Almawri
(74) *Attorney, Agent, or Firm* — Henry M. Feiereisen LLC

(57) ABSTRACT

The invention relates to a line bushing (1) in a housing (2) of an electrical machine (1) in explosive atmospheres, having a threaded bush (100) and a terminal stud (200), wherein the threaded bush (100) is an insulator and is located in, particularly screwed into, a recess in the housing (2), wherein the terminal stud (200) is made from an electrically conductive material and is provided, at least in sections, with a thread, wherein connection options (206) for
(Continued)

Figure 3:
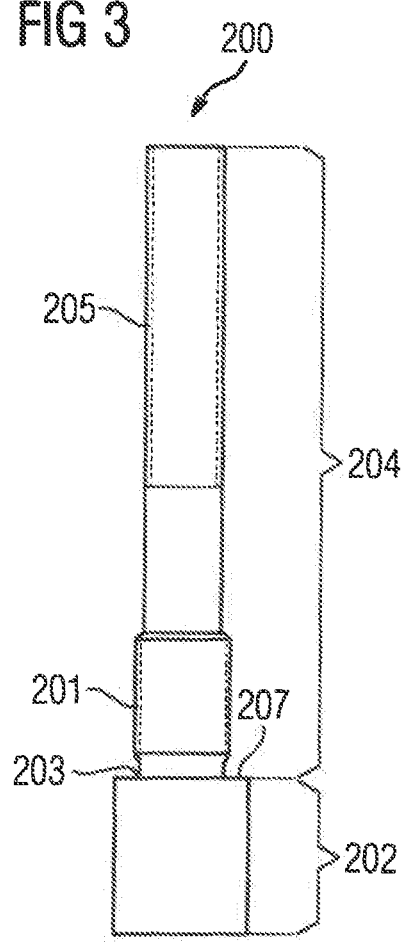

lines and braids are provided at either end of the terminal stud (200), wherein the terminal stud (200) can be screwed into the threaded bush (100).

3 Claims, 5 Drawing Sheets

(51) Int. Cl.
 *H01R 13/533* (2006.01)
 *H02G 3/22* (2006.01)
 *H02K 5/22* (2006.01)

(58) Field of Classification Search
 USPC ......... 310/88, 87; 439/370, 485, 260; 417/1; 174/167
 See application file for complete search history.

(56) References Cited

U.S. PATENT DOCUMENTS

| | | | | |
|---|---|---|---|---|
| 2,218,003 A * | 10/1940 | Hawley, Jr. | ............ | H02K 5/132 417/234 |
| 2,311,805 A * | 2/1943 | Yost | ............ | H01B 17/306 310/71 |
| 2,600,079 A * | 6/1952 | Scully | ............ | F16C 33/18 384/125 |
| 2,740,059 A * | 3/1956 | Conery | ............ | H02K 5/132 310/71 |
| 2,845,551 A * | 7/1958 | Potter | ............ | H02K 5/132 310/87 |
| 3,058,156 A * | 10/1962 | O'Connor | ............ | H02K 15/12 310/43 |
| 3,176,379 A * | 4/1965 | Brown | ............ | H02K 5/15 29/598 |
| 3,308,316 A * | 3/1967 | Pfahl | ............ | H02K 5/132 310/71 |
| 3,335,323 A * | 8/1967 | Molin | ............ | H02K 9/24 361/23 |
| 3,638,055 A * | 1/1972 | Zimmermann | ...... | H02K 44/085 310/43 |
| 4,015,633 A * | 4/1977 | Mandell | ............ | H02K 5/132 138/109 |
| 4,260,918 A * | 4/1981 | Engle | ............ | H02K 5/136 310/68 B |
| 4,401,734 A * | 8/1983 | Meyer | ............ | H01M 50/172 429/185 |
| 4,421,947 A * | 12/1983 | Kyle | ............ | A61N 1/3754 501/15 |
| 4,483,065 A * | 11/1984 | Meyer | ............ | H01B 17/30 29/623.2 |
| 4,626,721 A * | 12/1986 | Ouchi | ............ | F04D 13/0693 174/76 |
| 4,961,018 A * | 10/1990 | Akhter | ............ | F04D 13/086 310/71 |
| 5,203,723 A * | 4/1993 | Ritter | ............ | H01R 13/521 439/589 |
| 5,352,097 A * | 10/1994 | Itou | ............ | F04C 23/005 417/42 |
| 5,504,382 A * | 4/1996 | Douglass | ............ | H02K 21/20 310/410 |
| 5,889,343 A * | 3/1999 | Bryant | ............ | H02K 5/225 174/653 |
| 6,118,620 A * | 9/2000 | Grantz | ............ | G11B 19/2009 384/107 |
| 6,368,451 B1 * | 4/2002 | Goulette | ............ | H01J 37/32577 439/700 |
| 6,537,104 B1 * | 3/2003 | Hagmann | ............ | H02G 3/0666 439/461 |
| 7,443,067 B2 * | 10/2008 | Schlosser | ............ | F04D 13/10 417/423.15 |
| 7,786,635 B2 * | 8/2010 | Gasser | ............ | H02K 15/12 310/43 |
| 7,804,212 B2 * | 9/2010 | Moody | ............ | H02K 5/225 310/88 |
| 8,482,173 B2 * | 7/2013 | Wright | ............ | F04D 13/06 310/90 |
| 9,145,764 B2 * | 9/2015 | Burton | ............ | H02G 9/00 |
| 9,831,739 B2 * | 11/2017 | Tejano | ............ | H01R 39/64 |
| 9,929,608 B2 * | 3/2018 | Friedman | ............ | H02K 5/1732 |
| 9,973,053 B2 * | 5/2018 | Nakazumi | ............ | H02K 5/225 |
| 10,047,752 B2 * | 8/2018 | Hayakawa | ............ | F04D 29/528 |
| 10,978,225 B1 * | 4/2021 | Podpaly | ............ | H01B 17/305 |
| 2005/0074343 A1 * | 4/2005 | Naito | ............ | H02K 7/083 417/365 |
| 2007/0013245 A1 * | 1/2007 | Bevington | ............ | H02K 5/132 310/72 |
| 2007/0086902 A1 * | 4/2007 | Dooley | ............ | F04D 13/0606 417/356 |
| 2009/0152962 A1 * | 6/2009 | Gasser | ............ | H02K 5/24 310/43 |
| 2009/0155101 A1 * | 6/2009 | Fukasaku | ............ | H02K 5/10 417/410.1 |
| 2010/0176673 A1 * | 7/2010 | Wright | ............ | F04D 13/06 310/88 |
| 2010/0237721 A1 * | 9/2010 | Ishizue | ............ | H02K 5/225 310/43 |
| 2011/0095163 A1 * | 4/2011 | Phan | ............ | F16C 27/04 248/562 |
| 2011/0097219 A1 * | 4/2011 | Hsu | ............ | F04D 13/08 417/321 |
| 2011/0133582 A1 * | 6/2011 | Bingler | ............ | F04D 13/08 310/71 |
| 2011/0181221 A1 * | 7/2011 | Asahi | ............ | H02K 29/08 318/400.39 |
| 2013/0234541 A1 * | 9/2013 | Oleson | ............ | H02K 5/12 310/58 |
| 2013/0320792 A1 * | 12/2013 | Fukasaku | ............ | H02K 5/12 310/89 |
| 2013/0336817 A1 * | 12/2013 | Honda | ............ | H02K 3/522 310/71 |
| 2014/0050605 A1 * | 2/2014 | Inada | ............ | H02K 5/12 417/420 |
| 2014/0150592 A1 * | 6/2014 | Kremerman | ............ | B25J 11/0095 310/68 B |
| 2014/0271271 A1 * | 9/2014 | Intelisano | ............ | F04B 17/03 310/87 |
| 2014/0339939 A1 * | 11/2014 | Illingworth | ............ | H02K 11/33 310/88 |
| 2014/0375157 A1 * | 12/2014 | Taguchi | ............ | H02K 11/0094 310/71 |
| 2015/0083487 A1 * | 3/2015 | Leedecke | ............ | C03C 10/0009 174/659 |
| 2015/0110657 A1 * | 4/2015 | Spiegl | ............ | F04B 39/0016 417/552 |
| 2015/0256054 A1 * | 9/2015 | Northwall | ............ | H02K 11/40 310/680 |
| 2016/0128213 A1 * | 5/2016 | Wöhrstein | ............ | G01D 5/12 73/431 |
| 2016/0365770 A1 * | 12/2016 | Nelson | ............ | H02K 5/20 |
| 2016/0372987 A1 * | 12/2016 | Tejano | ............ | H02K 11/40 |
| 2017/0141634 A1 * | 5/2017 | Honda | ............ | H02K 3/522 |
| 2017/0194830 A1 * | 7/2017 | Poretti | ............ | H02K 11/0094 |
| 2017/0229943 A1 * | 8/2017 | Hattori | ............ | F01C 21/02 |
| 2017/0241246 A1 * | 8/2017 | Harnsberger | ............ | E21B 43/121 |
| 2017/0244294 A1 * | 8/2017 | Holzmueller | ............ | H02K 5/132 |
| 2017/0291847 A1 * | 10/2017 | Fritz | ............ | C03C 10/0036 |
| 2017/0324296 A1 * | 11/2017 | Fritts | ............ | H02K 5/225 |
| 2019/0047904 A1 * | 2/2019 | Fritz | ............ | C03C 10/0054 |

FOREIGN PATENT DOCUMENTS

| | | |
|---|---|---|
| GB | 1 031 353 A | 6/1966 |
| GB | 2 117 186 A | 10/1983 |

OTHER PUBLICATIONS

DIN EN 60079-1 (VDE 0170-5); Explosionsgefährdete Bereiche—Teil 1: Geräteschutz durch druckfeste Kapselung "d" (IEC 60079-

(56) References Cited

OTHER PUBLICATIONS

1:2014); Deutsche Fassung EN 60079-1:2014; Gesamtumfang 101 Seiten.

PCT International Search Report and Written Opinion of International Searching Authority dated Aug. 28, 2019 corresponding to PCT International Application No. PCT/EP2018/064420 filed Jun. 1, 2018.

* cited by examiner

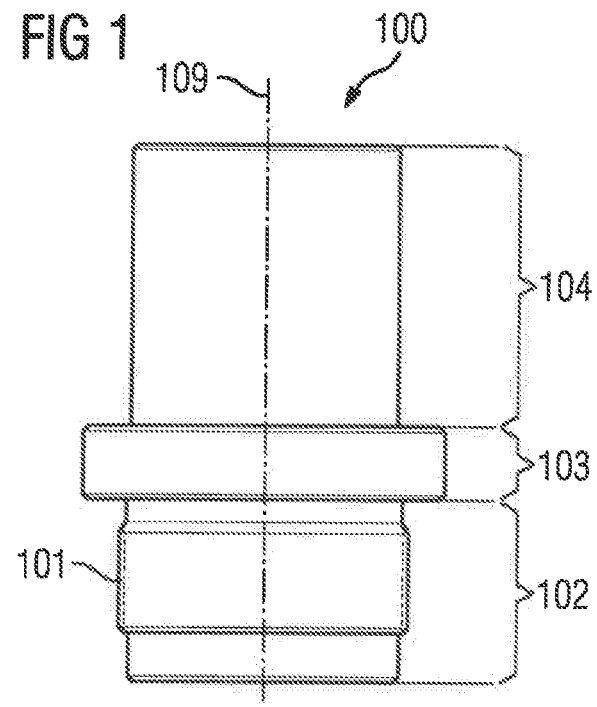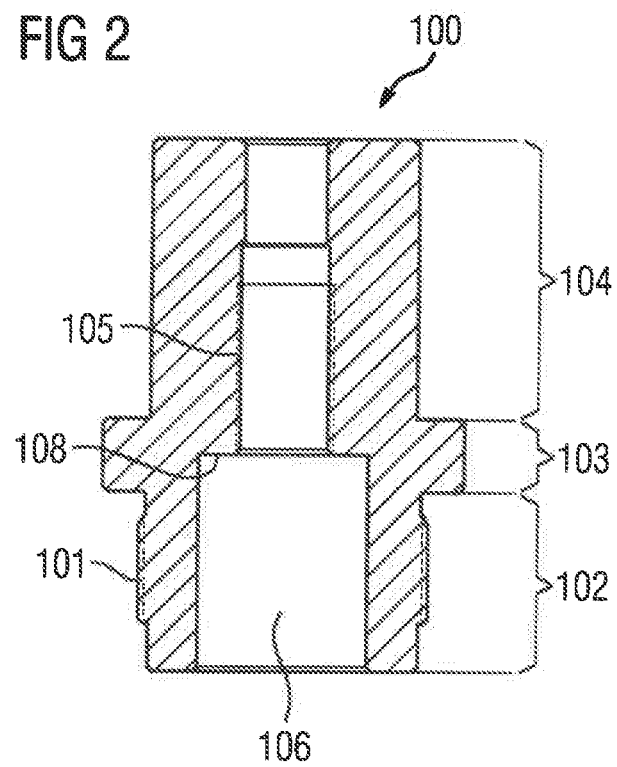

LINE BUSHING AND TERMINAL STUDS WITH INCREASED IGNITION GAPS

CROSS-REFERENCES TO RELATED APPLICATIONS

This application is the U.S. National Stage of International Application No, PCT/EP2018/064420, filed Jun. 1, 2018, which designated the United States and has been published as International Publication No. WO 2018/220156 A1 and which claims the priority of European Patent Application, Serial No. 17174312.3, filed Jun. 2, 2017, pursuant to 35 U.S.C. 119(a)-(d).

BACKGROUND OF THE INVENTION

The invention relates to a line bushing in a dynamo-electric machine that is to be operated in explosive atmospheres.

To this end the dynamo-electric machine and its attachments must comply with specifications set out in DIN EN 60079-0. According to these, Ex-d motors permit an explosion in the interior of the motor. It must merely be ensured that no sparks or flames can escape through openings in the housing of the dynamo-electric machine. To prevent this, so-called ignition gaps are provided, in which the ignited gas is cooled until it is extinguished and therefore there can be no outward harmful effects.

It must however nevertheless be ensured that the dynamo-electric machine is supplied with voltage and current via energy supply lines, so that an electrical connection must be established between the interior and the exterior of the dynamo-electric machine. These line lead-throughs must likewise comply with these specifications, so that the entire dynamo-electric machine satisfies the explosion protection specifications.

In line bushings of Ex-d motors a threaded bush has until now been screwed into a housing of the motor. Screwing to the housing in this way creates an ignition gap in the form of a threaded joint. The different types of ignition gaps are set out in standard DIN EN 60079-1 and are provided with the minimum dimensions stipulated there.

The current conduction from outside to inside has until now been realized by a bolt which in this case has a cylindrical gap between its threaded bush and its surface. This gap is to be worked precisely to high tolerances, in order to influence the width of the gap and thus the ignition gap and to keep its geometric dimensions as small as possible.

Based on this, the object underlying the invention is to provide a line bushing which with comparatively little effort and production costs complies with the necessary ignition gaps of a dynamo-electric machine, in particular a motor, in particular in accordance with the above-mentioned standard.

SUMMARY OF THE INVENTION

This object is achieved by a line bushing in a housing of a dynamo-electric machine in explosive atmospheres, having a threaded bush and a terminal stud, wherein the threaded bush is an insulator and is located in, in particular screwed into, a recess in the housing, wherein the terminal stud is made from an electrically conductive material and is provided, at least in sections, with a thread, wherein connection options for lines or braids are provided at either end of the terminal stud, wherein the terminal stud can be screwed into the threaded bush.

The set object is also achieved by a dynamo-electric machine having a line bushing.

According to the invention, the terminal stud is now provided with a thread, in just the same way as the threaded bush is provided with a thread, in order to be fixed in the housing of the motor.

Thanks to this inventive embodiment of the line bushing with two threaded joints, the number as well as the length of the ignition gap is increased, so that any gas ignited in the interior of the dynamo-electric machine is cooled via the gap until it is extinguished.

Thanks to the inventive structure of the line bushing the overall installation space occupied by this line bushing is additionally reduced. The dimensions of a threaded joint are, in the case of a predetermined length, e.g. of a housing wall, significantly longer than the size of a cylindrical gap. Furthermore, the production of a thread is significantly less expensive than the production of a long comparatively high-tolerance cylindrical bolt, which is very complex to produce. The gap width within a thread is also significantly easier to produce. In this respect threads can be produced significantly less expensively and can be more easily inspected for dimensional accuracy.

According to the invention, a dynamo-electric machine now has, on a line bushing, an electrically conductive terminal stud, e.g. made of copper, which is electrically conductively connected to the interior of the machine, in other words for example to the winding system or sensor lines. Energy supply lines or sensor lines are connected outwardly to the terminal studs. The terminal stud is positioned and fixed on the housing of a dynamo-electric machine via an electrically insulating threaded bush.

BRIEF DESCIRPTION OF THE DRAWING

Figure 4:
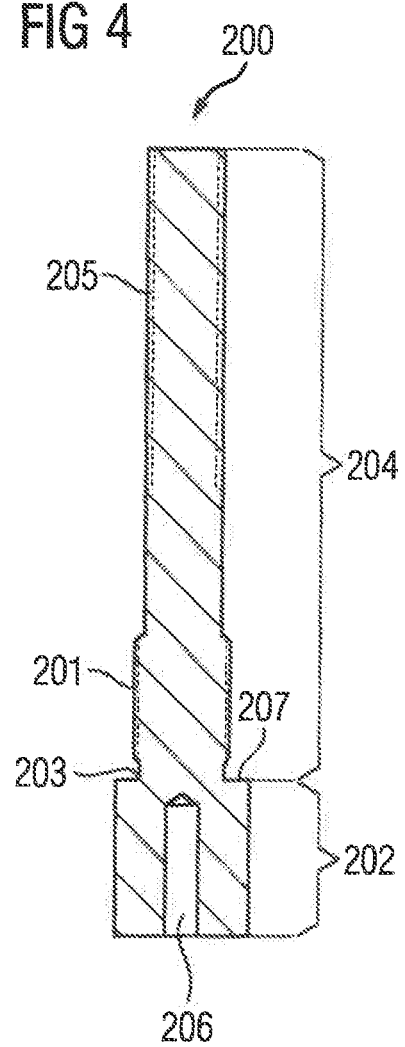
Figure 5:
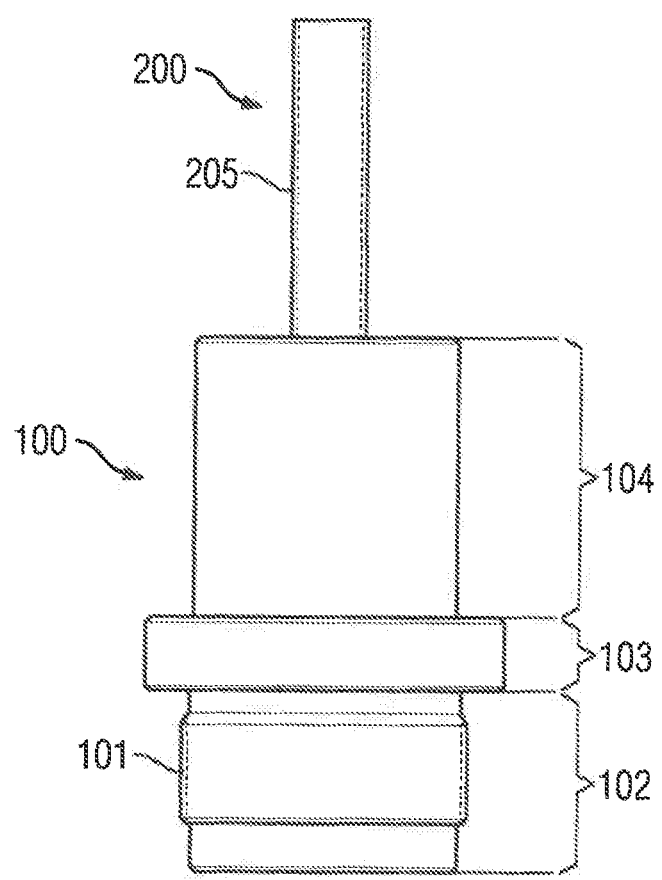
Figure 6:
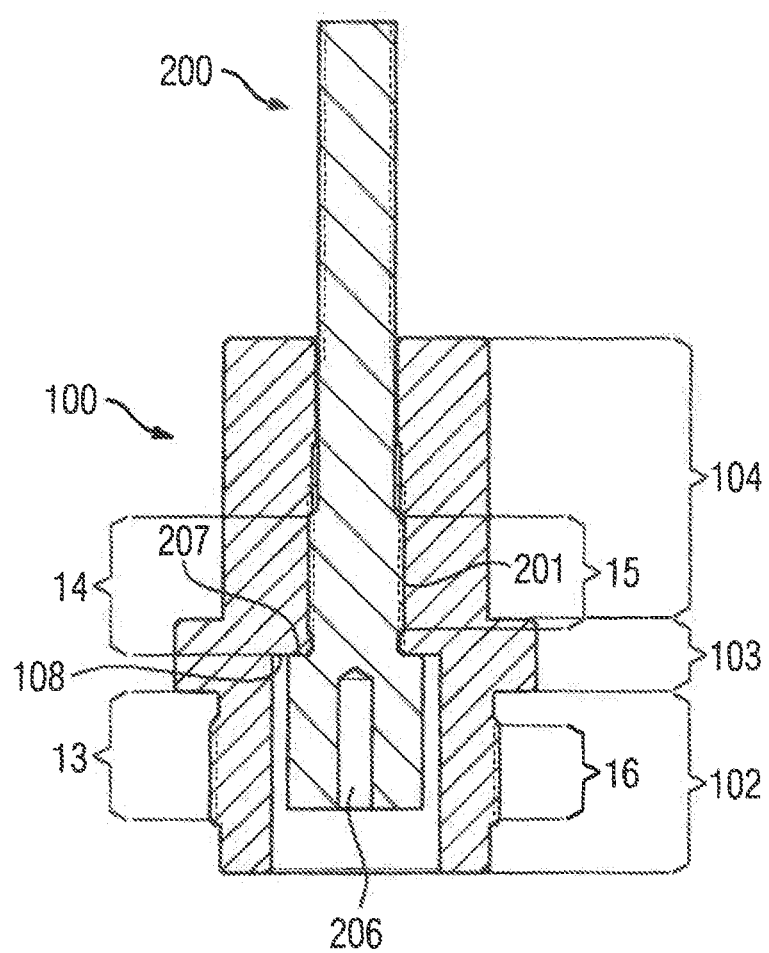
Figure 7:
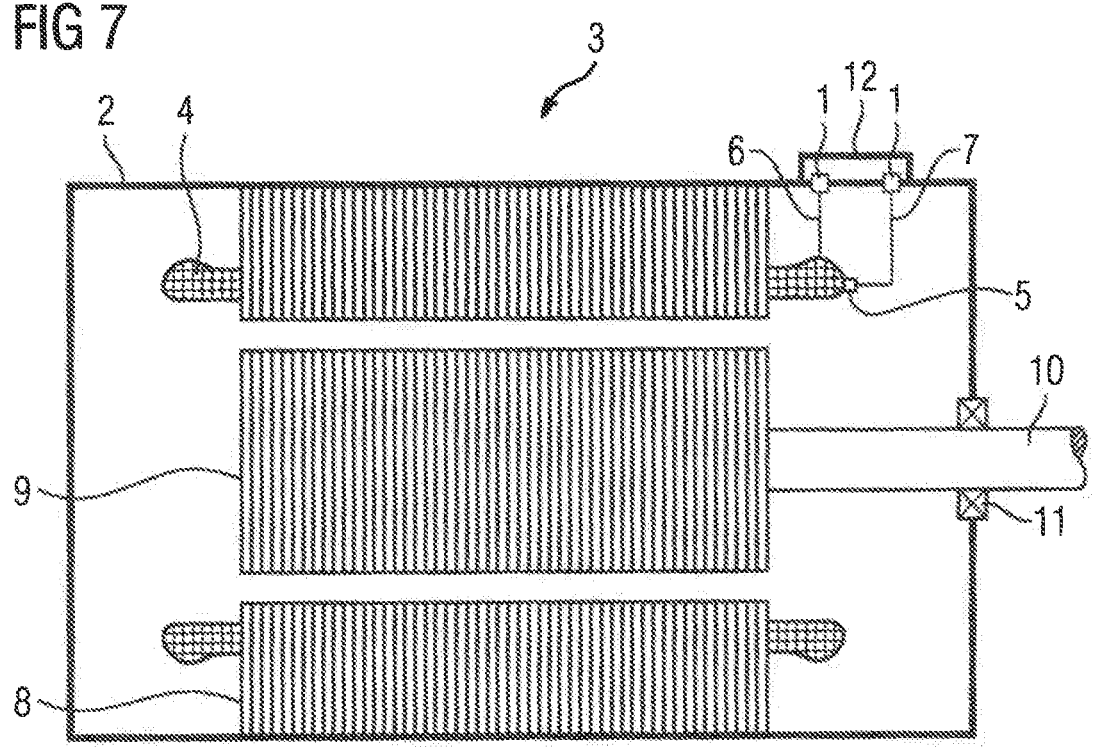

The invention and the advantageous embodiment of the invention are described in greater detail by reference to the following exemplary embodiments; in the figures:

FIG. 1 shows a side view of a threaded bush,
FIG. 2 shows a section through a threaded bush,
FIG. 3 shows a side view of a terminal stud,
FIG. 4 shows a section through a terminal stud,
FIG. 5 shows an assembled state of terminal studs and threaded bush,
FIG. 6 shows a section through the assembled state of terminal studs and threaded bush,
FIG. 7 shows a longitudinal section of a dynamo-electric machine having a line bushing of this type.

DETAILED DESCRIPTION OF PREFERRED EMBODIMENTS

FIG. 1 shows a side view of a threaded bush 100, which can be subdivided into several sections. These sections are a lower section 102, a collar 103 and an upper section 104.

The threaded bush 100 is rotationally symmetrical in respect of its axis 109. A male thread 101 is provided in the lower section 102 on a predefinable axial length of said section 102. The threaded bush 100 is fixed in the housing 2 of a dynamo-electric machine 1 via said male thread 101, as illustrated later.

FIG. 2 shows a longitudinal section of the threaded bush 100, with its sections 102, 103 and 104, wherein the threaded bush 100 has a recess 106 in the lower section 102, as well as on a certain predefinable axial section of the collar 103. In the remaining section of the collar 103 as well as in the upper section 104, a further recess is provided, which at least across an axial part of said sections 103 and 104 has a female thread 105.

FIG. 3 shows a terminal stud 200 with a lower section 202 which has a stop shoulder 207 and in a transition to the upper section 204 has a groove 203. Two male threads are provided in the upper section 204. A male thread 201 in the lower part of the upper section 204 and a male thread 205 in the upper part of the upper section 204. Wherein in this embodiment the male thread 201 has a larger diameter than the male thread 205.

FIG. 4 shows, in the longitudinal section of the terminal stud 200 in the lower section 202, a connection option 206 for lines and braids, e.g. for the electrical supply of the dynamo-electric machine. Furthermore, in this representation too, both male threads 205 and 201 are represented in the upper section 204 of the terminal stud 200.

FIG. 5 shows in the assembled state the threaded bush 100 with the terminal stud 200, which has been screwed into the threaded bush 100. The male thread 205 can be seen in the upper section of the terminal stud 200.

FIG. 6 shows, in a longitudinal section of the assembled state according to FIG. 5, the threaded bush 100 and the terminal stud 200. By screwing the terminal stud 200 into the threaded bush 100 or screwing the threaded bush 100 into the terminal stud 200 and the associated stop 207 on the shoulder 108, an ignition gap with its maximum screw reach 14 is formed by the thread 201.

This threaded connection has an axial thread length 15 in the engagement of the terminal stud 200 in the threaded bush 100.

Furthermore, a maximum screw reach 13 of the threaded bush is likewise provided in the housing 2. This threaded connection has an axial thread length 16 in the engagement of the threaded bush 100 in a housing 2.

A lock nut (not shown in greater detail) can be set, e.g. for positioning and fixing, on the male thread 205 in the upper part of the upper section 204 of the terminal stud 200.

In this case the ignition gaps are significantly longer than the axial thread lengths 15, 16 because of the thread configurations known per se. The width of the ignition gap also becomes comparatively narrow thanks to this threaded connection of terminal stud 200 and threaded bush 100 and/or threaded bush 100 and housing 2.

FIG. 7 shows a schematic longitudinal section of a dynamo-electric machine 3. The lines of a terminal box 12 are energy supply lines 6 and/or sensor lines 7, which run as a line bushing 1 through the housing 2 of the dynamo-electric machine 3. Energy supply lines 6 are necessary for the winding system 4 of the dynamo-electric machine 3 and generate an electromagnetic field in the stator 8, and as a result of electromagnetic interactions with a rotor 9 result in a rotation of the shaft 10, which is supported on the housing 2 by bearings 11.

The lines are electrically conductively contacted with the one or more terminal studs 200, which are embodied as electrically conductive.

The threaded bush 100 is made from electrically insulating material.

The invention claimed is:

1. A dynamo-electric machine for explosive environments, comprising:
   a housing having a threaded recess; and
   a line bushing made from an electrically conductive material and having a threaded portion and a stop shoulder and opposite ends, each of the opposite ends having a connection option for a line or braid,
   a threaded bush configured as an insulator and having a shoulder and an external thread with a first thread length for threaded engagement with the threaded recess of the housing, said shoulder and external thread defining a first ignition gap when the threaded bush is screwed into the threaded recess of the housing, and
   an internal thread with a second thread length for threaded engagement with the threaded portion of a terminal stud, with the second thread length being greater than the first thread length, said stop shoulder in conjunction with the second thread length defining a second ignition gap when the terminal stud is screwed into the threaded bush.

2. The dynamo-electric machine of claim 1, wherein the threaded bush has a thread height and the terminal stud has a thread height which is identical to the thread height of the threaded bush.

3. The dynamo-electric machine of claim 1, wherein the line is embodied as an energy supply line, a sensor line, or a data line.

* * * * *